United States Patent
Shmelkin et al.

(10) Patent No.: US 12,406,087 B2
(45) Date of Patent: Sep. 2, 2025

(54) DATA MINIMIZATION USING GLOBAL MODEL EXPLAINABILITY

(71) Applicant: International Business Machines Corporation, Armonk, NY (US)

(72) Inventors: Ron Shmelkin, Haifa (IL); Abigail Goldsteen, Haifa (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 275 days.

(21) Appl. No.: 17/985,483

(22) Filed: Nov. 11, 2022

(65) Prior Publication Data

US 2024/0160773 A1 May 16, 2024

(51) Int. Cl.
G06F 21/00 (2013.01)
G06F 21/62 (2013.01)

(52) U.S. Cl.
CPC ................ G06F 21/6245 (2013.01)

(58) Field of Classification Search
CPC .. G06F 21/6245; G06F 30/27; G06F 18/2113; G06N 5/02; G06N 20/00; G06N 3/082
See application file for complete search history.

(56) References Cited

U.S. PATENT DOCUMENTS

| | | | |
|---|---|---|---|
| 9,990,687 B1 | 6/2018 | Kaufhold et al. | |
| 10,706,329 B2 | 7/2020 | Anushiravani et al. | |
| 11,238,355 B2 | 2/2022 | Turner et al. | |
| 11,281,728 B2 | 3/2022 | Ezov et al. | |
| 11,354,274 B1 | 6/2022 | Ahirrao | |
| 2018/0130186 A1* | 5/2018 | Romanenko | G06T 7/10 |
| 2019/0303404 A1 | 10/2019 | Amer et al. | |
| 2020/0090075 A1 | 3/2020 | Achin et al. | |
| 2020/0134489 A1 | 4/2020 | Achin et al. | |
| 2020/0356891 A1* | 11/2020 | Saito | G06N 5/045 |
| 2021/0042356 A1* | 2/2021 | Ezov | G06F 18/22 |

(Continued)

FOREIGN PATENT DOCUMENTS

JP   6789934 B2   11/2020

OTHER PUBLICATIONS

Goldsteen et al., Data Minimization for GDPR Compliance in Machine Learning Models, Aug. 6, 2020.

(Continued)

Primary Examiner — Yogesh Paliwal
(74) Attorney, Agent, or Firm — Garg Law Firm, PLLC; Rakesh Garg; Steven Bouknight

(57) ABSTRACT

An embodiment analyzes a predictive model and its input data for the predictive model using an explainability algorithm resulting in a feature importance value of a feature. The embodiment analyzes feature values of the feature using a generalization function resulting in a set of candidate feature values. The embodiment determines an alternative feature based on the set of candidate feature values, wherein the alternative feature is a generalization of the feature. The embodiment compares an accuracy of the predictive model to a threshold performance value and, responsive to the accuracy being above the threshold performance value, maps feature values in the input data that are in the set of candidate feature values to a generalized representative value in the generalized domain.

20 Claims, 10 Drawing Sheets

(56) References Cited

U.S. PATENT DOCUMENTS

| | | |
|---|---|---|
| 2021/0042590 A1 | 2/2021 | Watts |
| 2021/0042629 A1 | 2/2021 | Ezov et al. |
| 2021/0133610 A1 | 5/2021 | Natesan Ramamurthy et al. |
| 2021/0150269 A1* | 5/2021 | Choudhury ......... G06V 30/1985 |
| 2021/0209072 A1* | 7/2021 | Trim ....................... G06F 40/30 |
| 2021/0390458 A1* | 12/2021 | Blumstein .............. G06N 20/00 |
| 2022/0129791 A1 | 4/2022 | Nia et al. |
| 2024/0160965 A1 | 5/2024 | Goldsteen et al. |

OTHER PUBLICATIONS

Goldsteen, Reduce data privacy issues with machine learning models, Jan. 18, 2022.
Rathi, A Novel Approach to Feature Importance—Shapley Additive Explanations, Jul. 2, 2020.
Severi et al., Explanation-Guided Backdoor Poisoning Attacks Against Malware Classifiers, Jan. 11, 2021.
Lundberg et al., A Unified Approach to Interpreting Model Predictions, Nov. 25, 2017.
List of all IBM related dockets, 2022.

* cited by examiner

DATA MINIMIZATION USING GLOBAL MODEL EXPLAINABILITY

BACKGROUND

The present invention relates generally to generalizing data. More particularly, the present invention relates to a method, system, and computer program for generalizing data for predictive models.

Data minimization may refer to the practice of limiting the collection of personal information to that which is directly relevant and necessary to accomplish a specified purpose. As companies and organizations began to understand the power of data, and as data becomes more ubiquitous and easier to collect, analysts are faced with an overwhelming amount of data. For a time, the impulse was to save all of it—indefinitely. With the fast adoption of smartphones, Internet of Things (IoT) devices, or the like, organizations are faced with more and more ways to collect more and more kinds of data, including and especially private, personally identifiable data. However, information protection requirements imposed by various statutes and regulations, such as the General Data Protection Regulation (GDPR), provide for data collection and retention limits. As a result, data managers must consider such compliance obligations and their strict limitations when implementing data collection and retention policies.

SUMMARY

The illustrative embodiments provide for data minimization using global model explainability. An embodiment includes analyzing a predictive model and input data for the predictive model using an explainability algorithm, the analyzing resulting in a feature importance value of a feature. The embodiment also includes analyzing feature values of the feature using a generalization function, where the analyzing of the feature values results in generation of a set of candidate feature values. The embodiment also includes determining, based on the set of candidate feature values, an alternative feature, where the alternative feature is a generalization of the feature, where the alternative feature is a generalized feature having a generalized domain, where each feature value in the generalized domain corresponds to one or more feature values in a domain of the feature, where a number of feature values in the domain is greater than a number of feature values in the generalized domain, whereby the generalized feature is a generalization of the feature. The embodiment also includes comparing an accuracy of the predictive model to a threshold performance value, where the accuracy is based on outputs of the predictive model using the alternative feature. The embodiment also includes mapping, responsive to the accuracy being above the threshold performance value, feature values in the input data that are in the set of candidate feature values to a generalized representative value in the generalized domain. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
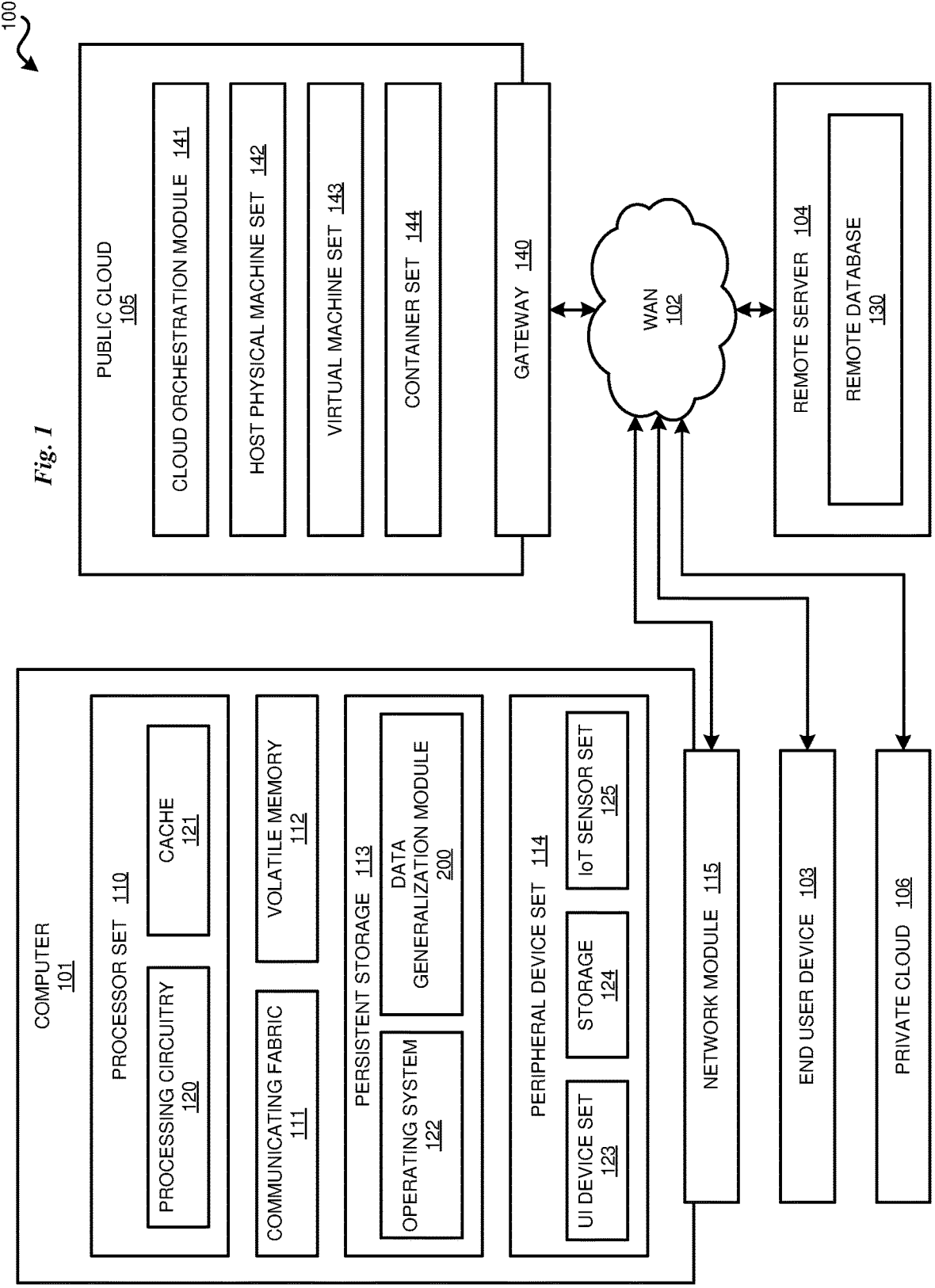
FIG. 1 depicts a block diagram of a computing environment in accordance with an illustrative embodiment.

Predictive modeling refers to a form of predictive analytics that typically uses a machine learning (ML) algorithm to build a predictive model (also referred to herein as a ML model or ML predictive model). There are countless applications for such models; however, for the sake of clarity of explanation, examples of applications are described herein that are only provided as illustrative context and are in no way intended to limit the scope of the present disclosure. There are also various performance metrics for predictive models (e.g., precision, specificity, error type, F1 score, etc.); however, for the sake of simplicity, predictive model performance will simply be referred to herein as model accuracy. The quality of a predictive model is typically based on the model's accuracy, with more accurate models generally being more desirable (subject to reasonable constraints, such as processing costs, etc.).

In many cases, the data that is collected and used as input for predictive models is subject to data collection and retention requirements. For example, the GDPR requires that only data that is strictly necessary for fulfilling a certain purpose should be collected. However, there are situations in which it is difficult to determine exactly what data is strictly necessary for a predictive model. For example, it is difficult to determine exactly what data, and what granularity (level of detail) of each feature, is strictly necessary for an ML predictive model to maintain a threshold level of accuracy.

Thus, one technical problem addressed herein involves determining what data is necessary for an ML model to make accurate predictions (i.e., predictions having a threshold level of accuracy). In some cases, it may be desired to minimize the data, e.g., the number of features that are being collected and their respective granularities, while still being able to utilize the predicative model to provide quality predictions.

Exemplary embodiments disclosed herein provide for a determination of a generalized version of the feature data that is input to an ML model and still enables the model to make predictions above a threshold level of accuracy. In some embodiments, a generalized version of numerical feature data includes a list of ranges, and a generalized version of categorical feature data is one or more groups of values.

As an example, data records that provide for feature data that is representative of people's ages may be used by a predictive ML model to predict heart attacks with about 90% accuracy. Data minimization that involves feature generalization may include replacing certain ages with an age range that still allows the ML model to maintain an accuracy of about 90%. In some embodiments, such generalizations may vary for different ranges of values. For example, an ML model may be able to maintain a threshold level of accuracy when ages from 20 to 30 are generalized to that ten-year range. However, the accuracy of that same ML model may drop below the threshold level when ages from 50 to 60 are generalized to a ten-year range, but the accuracy rises above the threshold when ages from 50 to 60 are generalized to five-year range. Thus, in such embodiments, some feature data values are generalized to a ten-year range, whereas other feature data values are generalized to a five-year range. In other words, in some embodiments, the generalized version of the feature data includes a plurality of different sizes of numerical ranges. As an example, in some embodiments, data generalization may allow for data minimization by allowing data indicative of people's exact ages to be replaced with a generalized version of the data that includes age ranges such as [1-20], [21-30], [31-40], [41-50], [51-55], [56-60], and so on, thereby reducing the granularity of the generalized feature data relative to the non-generalized version of the feature data.

In some exemplary embodiments, the alternative set of features may comprise a generalized feature corresponding to each feature of the set of features or a portion thereof. In some cases, the generalized feature may correspond to the feature itself, and have a generalized domain that comprises a smaller number of possible values than in the domain of the corresponding feature. In some cases, each value in the generalized domain may correspond one or more values in the non-generalized domain. Additionally, or alternatively, the alternative set of features may omit one or more redundant features from the set of features. The redundant features may not necessarily be redundant per se; however, their value may be relatively insignificant and may not be collected while maintaining a relative quality of prediction.

In some exemplary embodiments, a generalized instance may be obtained. The generalized instance may be a valuation to the alternative set of features. In some exemplary embodiments, a predicted label may be determined for the generalized instance. The predicted label may be determined by utilizing the predictive model. In some exemplary embodiments, the generalized instance may be used to generate an instance based thereon. In some cases, the instance may be generated using representative values to the features based on the actual values of generalized features. The predictive model may be used to predict a label for the generated instance and the predicted label may be used as the true label of the generalized instance.

Yet another technical problem dealt with by the disclosed subject matter is to minimize the data provided to a predictive model without affecting the performance measurement of the predictive model. It may be desired to minimize the data without causing the performance measurement of the predictive model to decrease below a threshold. The threshold may be an absolute threshold such as 90%, 92%, or the like. Additionally, or alternatively, the threshold may be a relative threshold, relative to the performance measurement of the predictive model before the data minimization. As an example, it may be desired that the after minimizing the data, the performance measurement may not decrease more than 5%.

Yet another technical problem dealt with by the disclosed subject matter is to minimize the amount of data that is requested from a user for a predictive model without affecting the performance of the predictive model. As an example, the predictive model may be configured to predict a label based on an income of a user. Generalization techniques disclosed herein may reveal that the predictive model is still just as accurate when the user instead only selects from certain income ranges.

One technical solution is to leverage global explainability analysis methods (such as SHAP and LIME) to help guide the process of data minimization for ML models. A global explainability analysis outputs a level of importance for each feature, where the "importance" of a feature refers to how significant or influential that feature was for the model in making its predictions. Such global explainability analysis techniques are used herein to provide global feature importance values. In some embodiments, it is desirable to perform generalizations that do not have (or have a minimal) effect on the model's accuracy. In some such embodiments, the global feature importance values are used to guide the selection of features and values to generalize by revealing the effect of each feature on the model's outcome.

In some embodiments, global explainability analysis techniques are used to reveal detailed information from a prediction model that is significantly informative for the generalization process. For example, in some embodiments, global explainability analysis techniques are used to identify features and values that "behave" similarly in the model, thereby revealing areas in the domain that, if generalized, will have a minimal effect on the model's accuracy.

In exemplary embodiments, the generalizing of one or more of a set of features yields data minimization. In some such embodiments, a predictive model is configured to predict a label for a valuation of a certain set of features, also referred to as an instance. In some exemplary embodiments, a global explainability analysis technique is used to identify features and values that "behave" similarly in the model, thereby revealing areas in the domain that, if generalized, will have a minimal effect on the model's accuracy. In some such embodiments, the overall feature importance of each feature is computed. In some such embodiments, the overall feature importance is determined by computing the normalized sums of SHAP values along each feature on a complete dataset. For categorical features that are one-hot encoded, the feature importance is accumulated across all encodings.

In an exemplary embodiment, once the relative importance of each of the features is revealed, features that have the least amount of influence on the predictive model can be identified as good candidates for generalization. If a feature has little or almost no influence on the classification predictions made by a predictive model, then there is a good possibility that the feature values can be at least somewhat altered without lowering the accuracy of the predictive model. Where feature values can be altered, a range of feature values can replace specific values, thereby allowing for generalization. Thus, in some embodiments, once the importance of each of the features is known, the generalization process selects a subset of features having relatively low feature-importance values i.e., the absolute SHAP mean value is close to zero.

In an exemplary embodiment, the generalization process evaluates feature values of the features in the subset of low-importance features. Since these features have been revealed to be good candidates for generalization, the feature values of these features are evaluated to identify actual feature values that can be generalized without degrading the quality of the predictive model. In some embodiments, this evaluation identifies the candidate feature values using a generalization function (e.g., k-means, decision tree, agglomerative clustering), meaning the generalization function identifies generalizations that minimize the reduction in accuracy of the predictive model.

In some exemplary embodiments, once a feature is identified as having one or more groups of feature values as generalization candidates, the feature is replaced with an alternative feature that is a generalization of the feature it replaces. As an example, instead of having a feature representing the precise age being any number between 1-120, the generalized feature may be a selection between a set of ranges, e.g., [1-20], [21-25], [26-50], [51-120], reducing the granularity of the non-generalized feature. In such a case, the domain of the feature comprised 120 separate values, while the domain of the generalized feature only comprises 4 separate values.

In some exemplary embodiments, a generalized feature has a generalized domain that comprises a smaller number of possible values than the domain of the corresponding original feature. In some cases, each value in the generalized domain may correspond with one or more values in the non-generalized domain.

In an exemplary embodiment, a validation process checks the generalized alternative feature to determine what effect, if any, the generalization has on the accuracy of the predictive model. In some embodiments, the validation compares an accuracy of the predictive model on the generalized data to a threshold performance value. In some embodiments, the threshold performance value is a baseline accuracy value of the predictive model using the original (pre-generalization) features. In some such embodiments, the threshold performance value and/or one or more prior accuracy values are stored as model history in the memory.

In some embodiments, the threshold performance value is an accuracy of the model prior to generalization of any of the features. In some embodiments, the performance value is based on an accuracy of the model prior to generalization of any of the features and other factors, such as a user-configurable tolerance value (e.g., to allow for reduction of accuracy within a specified tolerance percentage). In some embodiments, the performance value is a user-configurable value that allows a user to specify a value for a performance metric, for example a user-specified accuracy value.

In some embodiments, a data generalization process includes an iterative process that gradually increases the generalization of feature values while checking the accuracy of the predictive model such that the feature values are increasingly generalized until the accuracy of the model fails to satisfy the threshold performance value. This allows the data generalization process to generalize feature values to values that are generalized to the extent possible while still allowing the predictive model to maintain a threshold level of accuracy.

In some exemplary embodiments, the process may continue with additional features. After receiving a valuation for another generalized feature, the next feature may be generalized even further, or even omitted. After receiving the value of the next feature, the feature that follows may be generalized further, and so forth. In some cases, the determination of the generalized domain for a feature may be based on a value of a single previous feature, valuation of several previous features, or the like, in combination with information extracted from the auxiliary model.

In some exemplary embodiments, a User Interface (UI), such as Graphical User Interface (GUI), Voice User Interface (VUI), or the like, may be utilized to obtain from a user values for the alternative set of features, thereby obtaining the generalized instance. For each alternative feature comprised by the alternative set of features the UI may comprise a UI element corresponding thereto. In some exemplary embodiments, the user interface may be a dynamic user interface. The dynamic user interface may be configured to be updated based on dynamic display data provided thereto. In some embodiments, the dynamic display data provides instructions to update the user interface to replace a user input field configured to request or receive the original feature values with an alternative input field configured to request or receive the alternative generalized feature values. For example, an age feature, which includes any integer from 1 to 120 as a feature value, may be generalized to an alternative feature representative of age ranges, for example [1-20], [21-25], [26-50], [51-120]. In this example, the dynamic display data instructs the user interface to replace a user input field that requests an age with a user input field that requests selection of one of the age ranges. The user interface will then output a representative value that will be used as input to the ML runtime module for any value in the selected range.

In some exemplary embodiments, if a data generalization process determines that the accuracy of the predictive model using the alternative generalized feature values is acceptable, the data generalization process generates value mapping data. The value mapping data provides data mapping instructions to a value mapping module. In some embodiments, data mapping instructions include instructions to map feature values in a generalized range or group of values to a representative value for the generalized range or group. For example, if the generalization process has replaced the age feature, which includes any integer from 1 to 120 as a feature value, with an alternative feature representative of age ranges, for example [1-20], [21-25], [26-50], [51-120], the value mapping data will instruct the value mapping module to map any age from 1 to 20 to a first representative value for the first range, map any age from 21 to 25 to a second representative value for the second range, map any age from 26 to 50 to a third representative value for the third range, and map any age from 51 to 120 to a fourth representative value for the fourth range.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved data generalization module 200 that uses global explainability analysis to identify features that are good candidates for generalizing the input data needed by a predictive model without sacrificing the quality of the model's predictions. In addition to data generalization module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data generalization module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in data generalization module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in data generalization module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
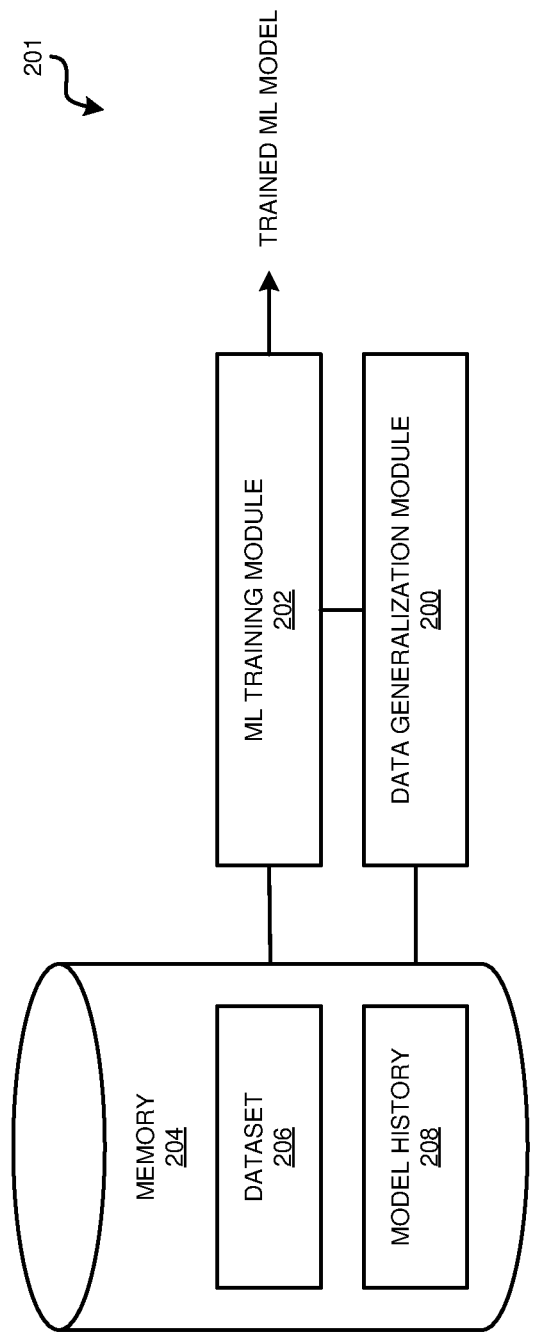
FIG. 2 depicts a block diagram of an example data processing environment that includes a data generalization module in accordance with an illustrative embodiment.

With reference to FIG. 2, this figure depicts a block diagram of an example data processing environment 201 that includes a data generalization module 200 in accordance with an illustrative embodiment. In the illustrated embodiment, the data processing environment 201 includes the data generalization module 200, a ML training module 202, and a memory 204 that stores dataset 206 and model history 208. In alternative embodiments, the data processing environment 201 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the ML training module 202 generates a trained machine learning (ML) model, also referred to herein as a predictive model. For example, in some embodiments, the ML model is a classification model trained to make class predictions from tabular input data, which may include features having numerical, categorical, and/or continuous data domains. In the illustrated embodiment, the training performed by the ML training module 202 may include training a new ML model and may include re-training a previously-trained ML model. For example, in some embodiments, the ML training module 202 initially trains the ML model using a non-generalized version of the dataset 206. In some such embodiments, the data generalization module 200 then generates a generalized version of the training data, and stores the generalized training dataset in the memory 204. In some such embodiments, the ML training module 202 then re-trains the ML model using the generalized training dataset. In the illustrated embodiment, the dataset 206 is stored in memory 204, where the memory 204 is representative of any non-volatile computer readable storage medium, local or remote, from which such training data may be retrieved. In some embodiments, the dataset 206 includes training data that the ML training module 202 uses during training epochs, and may also include testing data that the ML training module 202 uses for subsequent model evaluation.

In some exemplary embodiments, the ML model may be an ANN model such as a Convolutional Neural Network (CNN), a Recurrent Neural Network (RNN), a Deep Neural Network (DNN) model, or the like. Additionally, or alternatively, the ML model may be a classification model such as a Support Vector Machine (SVM), a decision tree, Naïve Bayes, or the like. In some exemplary embodiments, the ML model may be configured to predict a classification for an instance based on a set of features thereof.

In the illustrated embodiment, the data generalization module 200 determines a generalized version of feature data that is input to an ML model and still enables the model to make predictions above a threshold level of accuracy. In some embodiments, a generalized version of numerical feature data includes a list of ranges, and a generalized version of categorical feature data is one or more groups of values.

In some embodiments, the data generalization module 200 receives the trained ML predictive model from the ML training module 202, as well as one or more instances of the training data and/or testing data used to train the ML predictive model or another dataset with similar distribution. In some embodiments, the data generalization module 200 generates global explainability data for each of the features. The data generalization module 200 then analyzes feature values of a selected feature from among the set of features using a generalization function, wherein the analyzing of the feature values results in generation of a set of candidate feature values. The data generalization module 200 then determines an alternative feature as a generalization of the selected feature based on the set of candidate feature values.

In some embodiments, the data generalization module 200 compares an accuracy of the predictive model on the generalized data to a threshold performance value. In some embodiments, the threshold performance value is a baseline accuracy value of the predictive model using the original (pre-generalization) features. In some such embodiments, the threshold performance value and/or one or more prior accuracy values are stored as model history 208 in the memory 204.

The data generalization module 200 is thus able to compare an accuracy of the predictive model using generalized features to a threshold performance value, such as an accuracy of the model using the original features. This allows the data generalization module 200 to determine whether the generalization reduced the accuracy of the predictive model.

In some embodiments, the threshold performance value is an accuracy of the model prior to generalization of any of the features. In some embodiments, the performance value is based on an accuracy of the model prior to generalization of any of the features and other factors, such as a user-configurable tolerance value (e.g., to allow for reduction of accuracy within a specified tolerance percentage). In some embodiments, the performance value is a user-configurable value that allows a user to specify a value for a performance metric, for example a user-specified accuracy value.

In some embodiments, the data generalization module 200 performs an iterative process that gradually increases the generalization of feature values while checking the accuracy of the predictive model such that the feature values are increasingly generalized until the accuracy of the model fails to satisfy the threshold performance value. This allows the data generalization module 200 to generalize feature values to values that are generalized to the extent possible while still allowing the predictive model to maintain a threshold level of accuracy.

Figure 3:
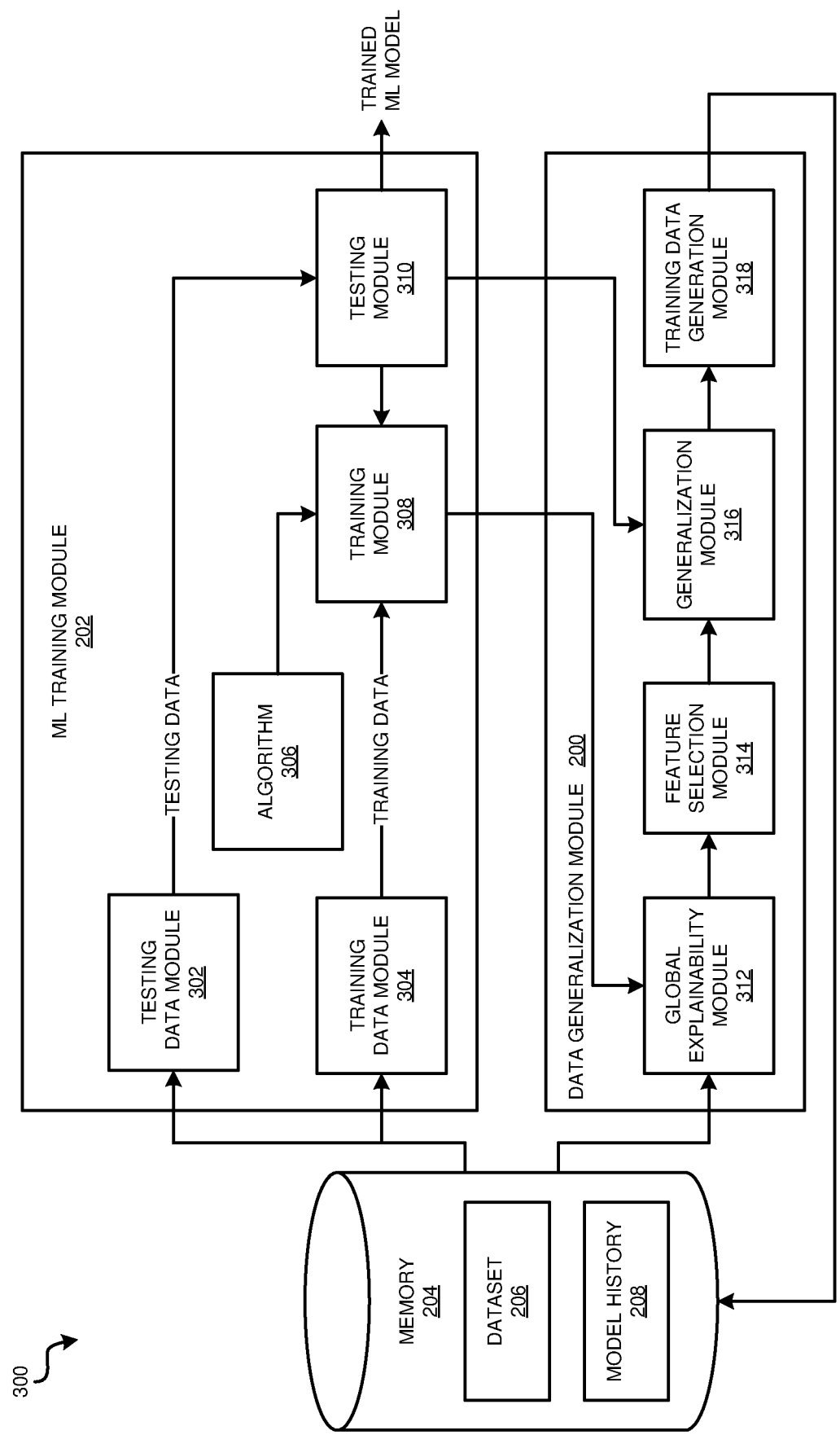
FIG. 3 depicts a block diagram of an example data processing environment in accordance with an illustrative embodiment.

With reference to FIG. 3, this figure depicts a block diagram of an example data processing environment 300 in accordance with an illustrative embodiment. In a particular embodiment, the data processing environment 300 is a more detailed example of the data processing environment 201 of FIG. 2.

In the illustrated embodiment, the ML training module 202 includes a testing data module 302, a training data module 304, an algorithm 306, a training module 308, and a testing module 310. The data generalization module 200 includes a global explainability module 312, a feature selection module 314, a generalization module 316, and a training data generation module 318. In alternative embodiments, the data processing environment 300 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the ML training module 202 receives dataset 206 from memory 204. In some embodiments, the ML model is a supervised model, meaning the model is trained using a supervised training process. In such embodiments, the dataset 206 comprises a heterogeneous matrix in which each row is an instance, and each column is a feature, except for an extra label column that is included in training data for supervised learning. Thus, each row is a valuation of the set of features for a given instance, plus a label used during the training process to check the output of the model for accuracy.

The ML training module 202 divides the dataset 206 into a training data set that is routed to the training data module 304 and a testing data set that is routed to the testing data module 302. The training module 308 receives the training data from the training data module 304 and the algorithm 306 and generates a trained ML predictive model. The algorithm 306 may be any of a variety of known algorithms having tunable parameters that are adjusted during the training phase to create a trained ML model and improve the accuracy of the model's predicted outputs for new inputs.

In some embodiments, the ML training module 202 includes a testing module 310 that monitors the model's ability to make predictions for the testing data set. For example, in some embodiments, the testing data set includes data that has not been processed by the ML model in order to allow the testing module 310 to evaluate the ML model's ability to generalize and accurately make predictions about the new data of the dataset 206.

In the illustrated embodiment, the data generalization module 200 determines a generalized version of feature data that is input to an ML model and still enables the model to make predictions above a threshold level of accuracy. In some embodiments, a generalized version of numerical feature data includes a list of ranges, and a generalized version of categorical feature data is one or more groups of values.

In the illustrated embodiment, the global explainability module 312 receives the trained ML predictive model from the training module 308 as well as one or more instances of the training/testing data and associated predictions made by the predictive model, and/or any other dataset having a distribution that is acceptably similar according to user preferences. The global explainability module 312 performs a global explainability analysis and outputs global explainability data that includes feature importance values that are indicative of a level of importance for each feature. The "importance" of a feature refers to how significant or influential that feature was for the model in making its predictions. In some such embodiments, the global explainability analysis includes determining a normalized sum of feature importance values for each feature. In some such embodiments, the global explainability module 312 sums each feature's importance values across all of the training instances. In some embodiments, the global explainability module 312 then normalizes each sum of feature importance values, resulting in global explainability or global feature importance values for each of the features. In some embodiments, the feature importance values are Shapely additive explanation (SHAP) scores.

In the illustrated embodiment, the global explainability module 312 provides the global explainability data to the feature selection module 314. In some embodiments, the feature selection module 314 sorts the features in ascending order according to the global feature importance values. In some embodiments, additional scaling can be implemented to adjust the global feature importance values prior to sorting. For example, in some embodiments, the feature importance values are weighted for features involving sensitive data, meaning data that one would reasonably prefer to retain as private or confidential information is scaled to make it a higher priority for generalization in order to generalize such sensitive data. As another example, in some embodiments, feature importance values are scaled according to the feature's domain size, meaning features with a larger domain will be prioritized to be generalized ahead of features with smaller domains. For example, a categorical feature with four categories will be scaled by ¼ while categorical feature with ten categories will be scaled by ¹⁄₁₀. This scaling works equivalently for continuous features. The assumption is that the feature with a higher initial domain can achieve better generalization. The feature selection module 314 will then select a feature as a generalization target based on the importance values subject to any scaling that has been done.

The feature selection module 314 then provides the selected feature to the generalization module 316. The generalization module 316 evaluates feature values of the selected feature to identify candidate feature values for generalization. Since these features have been revealed to be good candidates for generalization, the feature values of these features are evaluated to identify actual feature values that can be generalized without degrading the quality of the predictive model.

In some embodiments, the generalization module 316 attempts to identify a set of candidate feature values of the selected feature. In some such embodiments, the generalization module 316 identifies the candidate feature values using a generalization function (e.g., k-means, decision tree, agglomerative clustering), meaning the generalization function identifies a generalization that minimizes the reduction in accuracy of the predictive model.

In some embodiments, the generalization function uses agglomerative hierarchical clustering. Using a bottom-up approach, the agglomerative hierarchical clustering starts without any generalizations and tries to generalize as much as possible. The algorithm will generalize/merge different values that minimize model's accuracy reduction. Each sample starts as an independent cluster. Aggregation attempts between different clusters are performed based on some distance metric (e.g., the distance between centroids), and the decision whether to aggregate or not is taken based on the criteria function (e.g., model's accuracy).

In some embodiments, the generalization function uses a decision tree. In such embodiments, the process trains a decision tree on the selected feature and prunes the decision tree accordingly. Thus, instead of aggregation that is done using the agglomerative hierarchical clustering, the decision tree embodiment prunes the decision tree.

In some embodiments, the generalization function uses a binary Search on K in a K-means algorithm. In such embodiments, the process tries to cluster the feature space into a minimal number of clusters as much as possible. For K_i (K in iteration i), the process applies the proposed generalization. Generalization is defined by the min and max values of each cluster. If the accuracy reduction is below the defined threshold, the process will try a smaller number of clusters (better generalization) K_j<K_i. Otherwise, the process will try to increase the number of clusters, with the next K being chosen based on a binary search algorithm.

In some exemplary embodiments, once the generalization module 316 identifies a feature as having one or more groups of feature values as generalization candidates, the generalization module 316 selects that feature for generalization. The generalization module 316 replaces the selected feature with an alternative feature that is a generalization of the selected feature. As an example, the selected feature may be representative of age based on the feature selection module 314 determining that the age feature has a relatively low feature importance value and the generalization module 316 identifying groups of ages that are good generalization candidates. The generalization module 316 then replaces the age feature, which includes any integer from 1 to 120 as a feature value, with an alternative feature representative of age ranges, for example [1-20], [21-25], [26-50], [51-120]. Thus, the granularity of the selected feature is reduced with the alternative feature, from a domain of 120 separate values, to a generalized domain of four separate values.

In the illustrated embodiment, the training data generation module 318 updates the dataset 206 of training/testing data by replacing the selected feature with the alternative generalized feature. In some embodiments, the ML training module 202 then retrains the ML model using the updated dataset 206 with the generalized feature. In an exemplary embodiment, a validation process checks the generalized alternative feature to determine what effect, if any, the generalization has on the accuracy of the predictive model. In some such embodiments, the testing module 310 evaluates the ML model's accuracy on the generalized training data and outputs an accuracy value to the generalization module 316, which records the value in the model history 208. The generalization module 316 compares an accuracy of the predictive model to a threshold performance value. In some embodiments, the threshold performance value is a baseline accuracy value of the predictive model using the original (pre-generalization) features. In some such embodiments, the threshold performance value and/or one or more prior accuracy values are stored as model history 208 in the memory 204.

The generalization module 316 is thus able to compare an accuracy of the predictive model using generalized features to a threshold performance value, such as an accuracy of the model using the original features. This allows the generalization module 316 to determine whether the generalization reduced the accuracy of the predictive model.

In some embodiments, the threshold performance value is an accuracy of the model prior to generalization of any of the features. In some embodiments, the performance value is based on an accuracy of the model prior to generalization of any of the features and other factors, such as a user-configurable tolerance value (e.g., to allow for reduction of accuracy within a specified tolerance percentage). In some embodiments, the performance value is a user-configurable value that allows a user to specify a value for a performance metric, for example a user-specified accuracy value.

In some embodiments, the data generalization module 200 performs an iterative process that gradually increases the generalization of feature values while checking the accuracy of the predictive model such that the feature values are increasingly generalized until the accuracy of the model fails to satisfy the threshold performance value. This allows the data generalization module 200 to generalize feature values to values that are generalized to the extent possible while still allowing the predictive model to maintain a threshold level of accuracy.

Figure 4:
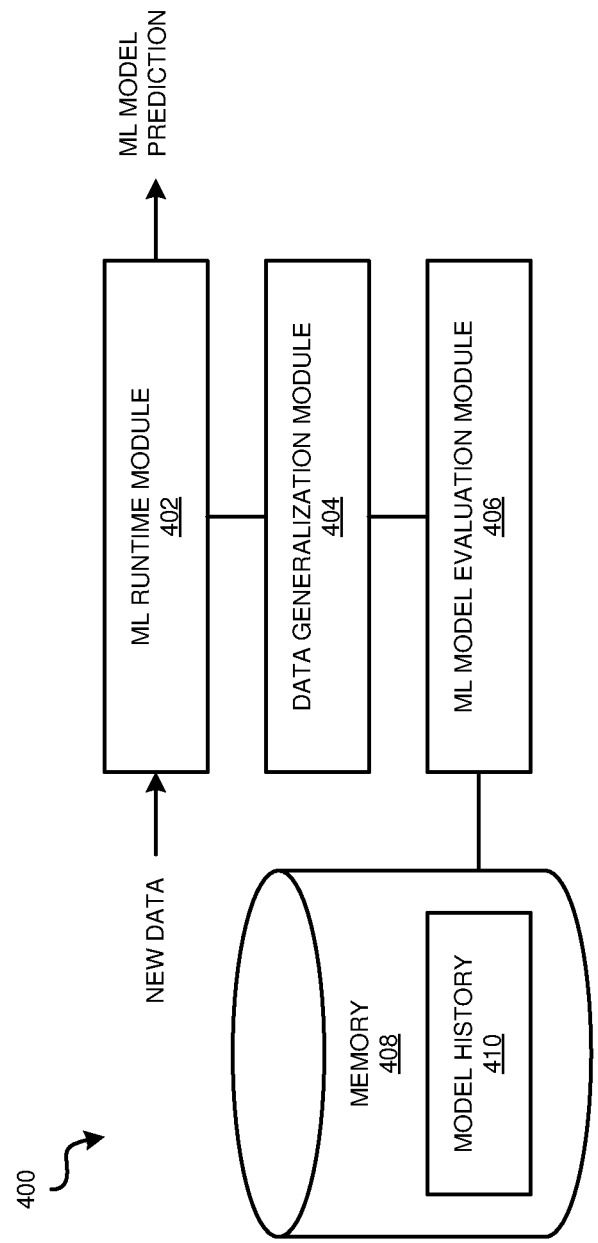
FIG. 4 depicts a block diagram of an example data processing environment in accordance with an illustrative embodiment.

With reference to FIG. 4, this figure depicts a block diagram of an example data processing environment 400 in accordance with an illustrative embodiment. In some embodiments, the data generalization module 404 is an example of the data generalization module 200 of FIG. 1. As shown in FIG. 4, in some embodiments, the data generalization module 404 generalizes a trained predictive model operating in a runtime environment in which the model makes predictions for new data.

In the illustrated embodiment, the data processing environment 400 includes the data generalization module 404, a ML runtime module 402, a ML model evaluation module 406, and a memory 408 that stores model history 410. In alternative embodiments, the data processing environment 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the ML runtime module 402 includes a trained machine learning (ML) model, also referred to herein as a predictive model. For example, in some embodiments, the ML model is a classification model trained to make class predictions from tabular input data, which may include features having numerical, categorical, and/or continuous data domains. In the illustrated embodiment, the ML runtime module 402 stores the accuracy of the ML model as model history 410 in memory 408, where the memory 408 is representative of any non-volatile computer readable storage medium, local or remote, from which such training data may be retrieved.

In some exemplary embodiments, the ML model may be an ANN model such as a Convolutional Neural Network (CNN), a Recurrent Neural Network (RNN), a Deep Neural Network (DNN) model, or the like. Additionally, or alternatively, the ML model may be a classification model such as a Support Vector Machine (SVM), a decision tree, Naïve Bayes, or the like. In some exemplary embodiments, the ML model may be configured to predict a classification for an instance based on a set of features thereof.

In the illustrated embodiment, the data generalization module 404 determines a generalized version of feature data that is input to an ML model and still enables the model to make predictions above a threshold level of accuracy. In some embodiments, a generalized version of numerical feature data includes a list of ranges, and a generalized version of categorical feature data is one or more groups of values.

In some embodiments, the data generalization module 404 receives the trained ML predictive model from the ML runtime module 402, as well as one or more instances of the new data that is inputted to the ML predictive model. In some embodiments, the data generalization module 404 generates a subset of features that are identified, using global explainability data, as being among the least important features. The data generalization module 404 then generates of a set of candidate feature values based on an analysis of a selected feature from the subset of features. The data generalization module 404 then determines an alternative feature as a generalization of the selected feature based on the set of candidate feature values.

In some embodiments, the ML model evaluation module 406 determines an accuracy of the ML model using the generalized alternative feature. The ML model evaluation module 406 then provides an accuracy value to the data generalization module 404 representative of the determined accuracy of the ML model using the generalized alternative feature. In some embodiments, the ML model evaluation module 406 also stores the accuracy value with the model history 410 in the memory 408.

The data generalization module 404 compares the accuracy of the predictive model to a threshold performance value. In some embodiments, the threshold performance value is a baseline accuracy value of the predictive model using the original (pre-generalization) features. In some such embodiments, the threshold performance value and/or one or more prior accuracy values are stored as model history 410 in the memory 408.

The data generalization module 404 is thus able to compare an accuracy of the predictive model using generalized features to a threshold performance value, such as an accuracy of the model using the original features. This allows the data generalization module 404 to determine whether the generalization reduced the accuracy of the predictive model.

In some embodiments, the threshold performance value is an accuracy of the model prior to generalization of any of the features. In some embodiments, the performance value is based on an accuracy of the model prior to generalization of any of the features and other factors, such as a user-configurable tolerance value (e.g., to allow for reduction of accuracy within a specified tolerance percentage). In some embodiments, the performance value is a user-configurable value that allows a user to specify a value for a performance metric, for example a user-specified accuracy value.

In some embodiments, the data generalization module 404 performs an iterative process that gradually increases the generalization of feature values while checking the accuracy of the predictive model such that the feature values are increasingly generalized until the accuracy of the model fails to satisfy the threshold performance value. This allows the data generalization module 404 to generalize feature values to values that are generalized to the extent possible while still allowing the predictive model to maintain a threshold level of accuracy.

Figure 5:
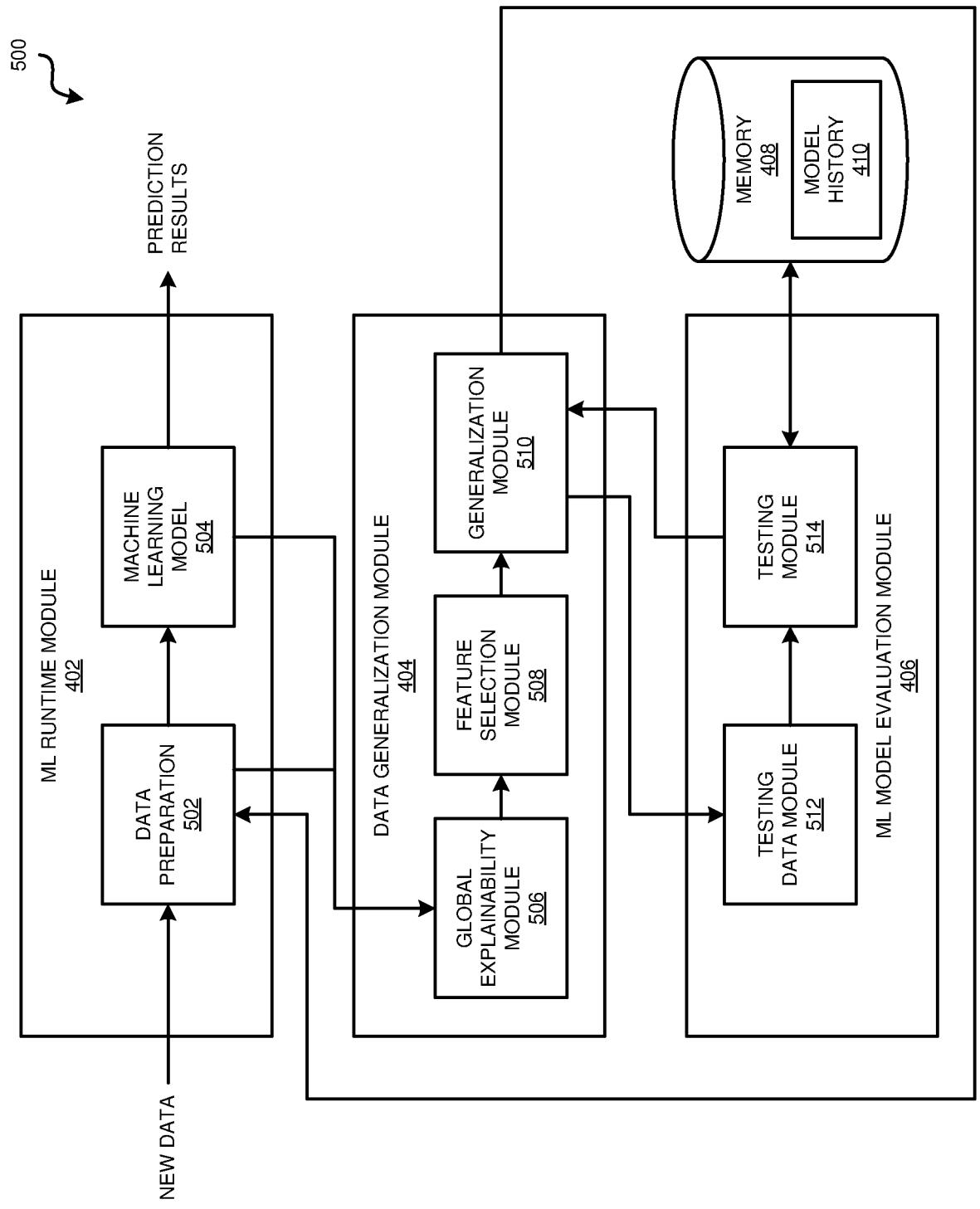
FIG. 5 depicts a block diagram of an example data processing environment in accordance with an illustrative embodiment.

With reference to FIG. 5, this figure depicts a block diagram of an example data processing environment 500 in accordance with an illustrative embodiment. In a particular embodiment, the data processing environment 500 is a more detailed example of the data processing environment 400 of FIG. 4.

In the illustrated embodiment, the data processing environment 500 includes a ML runtime module 402, a data generalization module 404, and a ML model evaluation module 406. The ML runtime module 402 includes a data preparation module 502 and a machine learning model 504. The data generalization module 404 includes a global explainability module 506, a feature selection module 508, and a generalization module 510. The ML model evaluation module 406 includes a testing data module 512 and a testing module 514. In alternative embodiments, the data processing environment 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the ML runtime module 402 receives new data that includes data instances for which predictions by the machine learning model 504 are sought. In some embodiments, the new data is tabular data, such as data in a spreadsheet, database, or comma separated variable (CSV) file. In some embodiments, the new data is raw data. The data preparation 502 performs data preparation on the incoming data as necessary to prepare the data for processing by the machine learning model 504.

The data preparation 502 then provides the prepared data to the machine learning model 504. The ML runtime module 402 then uses the machine learning model 504 to infer and make predictions about the input new data.

In the illustrated embodiment, the data generalization module 404 determines a generalized version of feature data that is input to an ML model and still enables the model to make predictions above a threshold level of accuracy. In some embodiments, a generalized version of numerical feature data includes a list of ranges, and a generalized version of categorical feature data is one or more groups of values.

In the illustrated embodiment, the global explainability module 506 receives the trained ML predictive model machine learning model 504 from the ML runtime module 402 as well as one or more instances of the new data and associated predictions made by the machine learning model 504. The global explainability module 506 performs a global explainability analysis and outputs global explainability data that includes feature importance values that are indicative of a level of importance for each feature. The "importance" of a feature refers to how significant or influential that feature was for the model in making its predictions. In some such embodiments, the global explainability analysis includes determining a normalized sum of feature importance values for each feature. In some such embodiments, the global explainability module 506 sums each feature's importance values across all of the training instances. In some embodiments, the global explainability module 506 then normalizes each sum of feature importance values, resulting in global explainability or global feature importance values for each of the features. In some embodiments, the feature importance values are Shapely additive explanation (SHAP) scores.

In the illustrated embodiment, the global explainability module 506 provides the global explainability data to the feature selection module 508. In the illustrated embodiment, the global explainability module 506 provides the global explainability data to the feature selection module 508. In some embodiments, the feature selection module 508 sorts the features in ascending order according to the global feature importance values. In some embodiments, additional scaling can be implemented to adjust the global feature importance values prior to sorting. For example, in some embodiments, the feature importance values are weighted for features involving sensitive data, meaning data that one would reasonably prefer to retain as private or confidential information is scaled to make it a higher priority for generalization in order to generalize such sensitive data. As another example, in some embodiments, feature importance values are scaled according to the feature's range, meaning features with a larger domain will be prioritized to be generalized ahead of features with smaller domains. For example, a categorical feature with four categories will be scaled by ¼ while categorical feature with ten categories will be scaled by ⅒. This scaling works equivalently for continuous features. The assumption is that the feature with a higher initial domain can achieve better generalization. The feature selection module 508 will then select a feature as a generalization target based on the importance values subject to any scaling that has been done.

The feature selection module 508 then provides the selected feature to the generalization module 510. The generalization module 510 evaluates feature values of the selected feature to identify candidate feature values for generalization. Since these features have been revealed to be good candidates for generalization, the feature values of these features are evaluated to identify actual feature values that can be generalized without degrading the quality of the predictive model. In some embodiments, this evaluation searches for feature values In some embodiments, the generalization module 510 attempts to identify a set of candidate feature values of the selected feature. In some such embodiments, the generalization module 510 identifies the candidate feature values using a generalization function (e.g., k-means, decision tree, agglomerative clustering), meaning the generalization function minimizes the reduction in accuracy of the predictive model.

In some embodiments, the generalization function uses agglomerative hierarchical clustering. Using a bottom-up approach, the agglomerative hierarchical clustering starts without any generalizations and tries to generalize as much as possible. The algorithm will generalize/merge different values that minimize model's accuracy reduction. Each sample starts as an independent cluster. Aggregation attempts between different clusters are performed based on some distance metric (e.g., the distance between centroids), and the decision whether to aggregate or not is taken based on the criteria function (e.g., model's accuracy).

In some embodiments, the generalization function uses a decision tree. In such embodiments, the process trains a decision tree on the selected feature and prunes the decision tree accordingly. Thus, instead of aggregation that is done using the agglomerative hierarchical clustering, the decision tree embodiment prunes the decision tree.

In some embodiments, the generalization function uses a binary Search on K in a K-means algorithm. In such embodiments, the process tries to cluster the feature space into a minimal number of clusters as much as possible. For K_i (K in iteration i), the process applies the proposed generalization. Generalization is defined by the min and max values of each cluster. If the accuracy reduction is below the defined threshold, the process will try a smaller number of clusters (better generalization) K_j<K_i. Otherwise, the process will try to increase the number of clusters, with the next K being chosen based on a binary search algorithm.

In some exemplary embodiments, once the generalization module 510 identifies a feature as having one or more groups of feature values as generalization candidates, the generalization module 510 selects that feature for generalization. The generalization module 510 replaces the selected feature with an alternative feature that is a generalization of the selected feature. As an example, the selected feature may be representative of age based on the feature selection module 508 determining that the age feature has a relatively low feature importance value and the generalization module 510 identifying groups of ages that are good generalization candidates. The generalization module 510 then replaces the age feature, which includes any integer from 1 to 120 as a feature value, with an alternative feature representative of age ranges, for example [1-20], [21-25], [26-50], [51-120]. Thus, the granularity of the selected feature is reduced with the alternative feature, from a domain of 120 separate values, to a generalized domain of four separate values.

In the illustrated embodiment, the ML model evaluation module 406 evaluates the machine learning model 504 with the alternative generalized feature. The testing data module 512 updates the new data received from the ML runtime module 402 by replacing the selected feature with the alternative generalized feature. The testing module 514 then performs a validation process that checks the generalized alternative feature to determine what effect, if any, the generalization has on the accuracy of the machine learning model 504. In some such embodiments, the testing module 514 evaluates the ML model's ability to generalize and accurately make predictions about the updated generalized data of the new data and outputs an accuracy value to the generalization module 510 and records the value in the model history 410. The generalization module 510 compares an accuracy of the predictive model to a threshold performance value. In some embodiments, the threshold performance value is a baseline accuracy value of the predictive model using the original (pre-generalization) features. In some such embodiments, the threshold performance value and/or one or more prior accuracy values are stored as model history 410 in the memory 408.

The generalization module 510 is thus able to compare an accuracy of the predictive model using generalized features to a threshold performance value, such as an accuracy of the model using the original features. This allows the generalization module 510 to determine whether the generalization reduced the accuracy of the predictive model.

In some embodiments, the threshold performance value is an accuracy of the model prior to generalization of any of the features. In some embodiments, the performance value is based on an accuracy of the model prior to generalization of any of the features and other factors, such as a user-configurable tolerance value (e.g., to allow for reduction of accuracy within a specified tolerance percentage). In some embodiments, the performance value is a user-configurable value that allows a user to specify a value for a performance metric, for example a user-specified accuracy value.

In some embodiments, the data generalization module 404 performs an iterative process that gradually increases the generalization of feature values while checking the accuracy of the predictive model such that the feature values are increasingly generalized until the accuracy of the model fails to satisfy the threshold performance value. This allows the data generalization module 404 to generalize feature values to values that are generalized to the extent possible while still allowing the predictive model to maintain a threshold level of accuracy.

Figure 6:
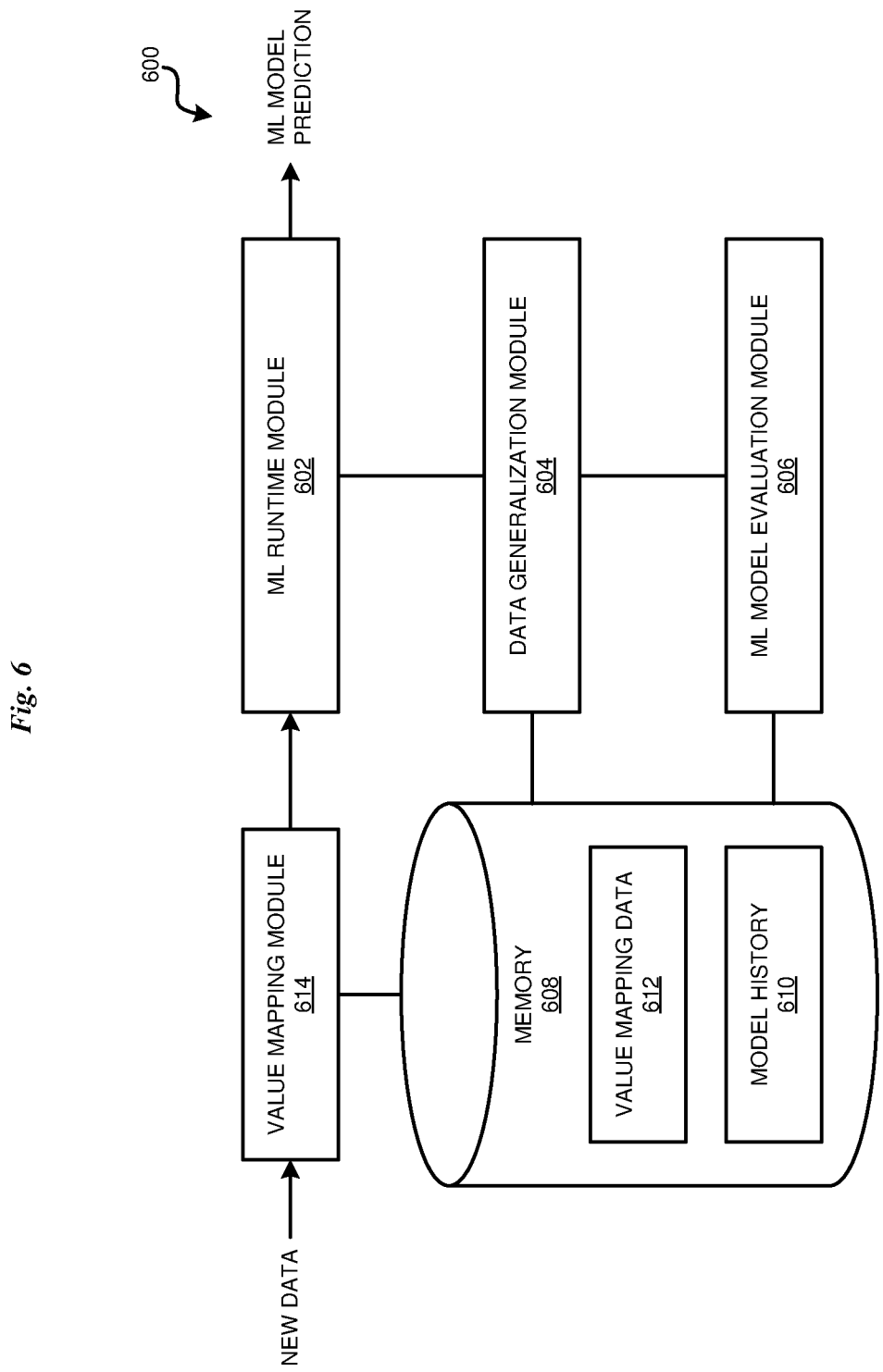
FIG. 6 depicts a block diagram of an example data processing environment in accordance with an illustrative embodiment.

With reference to FIG. 6, this figure depicts a block diagram of an example data processing environment 600 in accordance with an illustrative embodiment. In some embodiments, the data processing environment 600 includes a ML runtime module 602, a data generalization module 604, a ML model evaluation module 606, and a memory 608, which are examples of the ML runtime module 402, data generalization module 404, ML model evaluation module 406, and memory 408, respectively, of FIG. 4. Thus, the descriptions of the ML runtime module 402, data generalization module 404, ML model evaluation module 406, and memory 408 in connection with FIG. 4 apply equally to the ML runtime module 602, data generalization module 604, ML model evaluation module 606, and memory 608, respectively, except where described below. In still further embodiments, the ML training module 202 may be used in place of the ML runtime module 602 such that the value mapping data 612 and value mapping module 614 described below are used to map feature values in training and/or testing data and/or another dataset having a distribution that is acceptably similar according to user preferences In the illustrated embodiment, the data generalization module 604 determines a generalized version of feature data that is input to an ML model and still enables the model to make predictions above a threshold level of accuracy. In some embodiments, the ML model evaluation module ML model evaluation module 606 then determines an accuracy of the ML model using the generalized alternative feature. The ML model evaluation module 606 then provides an accuracy value to the data generalization module 604 representative of the determined accuracy of the ML model using the generalized alternative feature. In some embodiments, the ML model evaluation module 606 also stores the accuracy value with the model history 610 in the memory 608.

The data generalization module 604 compares the accuracy of the predictive model to a threshold performance value. In some embodiments, the threshold performance value is a baseline accuracy value of the predictive model using the original (pre-generalization) features. In some such embodiments, the threshold performance value and/or one or more prior accuracy values are stored as model history 610 in the memory 608.

In the illustrated embodiment, if the data generalization module 604 determines that the accuracy of the predictive model using the alternative generalized feature values is acceptable, the data generalization module 604 generates value mapping data 612. The value mapping data 612 provides data mapping instructions to a value mapping module 614. In some embodiments, data mapping instructions include instructions to map feature values in a generalized range or group of values to a representative value for the generalized range or group. For example, if the generalization module 604 has replaced the age feature, which includes any integer from 1 to 120 as a feature value, with an alternative feature representative of age ranges, for example [1-20], [21-25], [26-50], [51-120], the value mapping data 612 will instruct the value mapping module 614 to map any age from 1 to 20 to a first representative value for the first range, map any age from 21 to 25 to a second representative value for the second range, map any age from 26 to 50 to a third representative value for the third range, and map any age from 51 to 120 to a fourth representative value for the fourth range.

In some embodiments, where the generalization is a numerical range, the representative value is a median value of the numerical range (e.g., the first representative value for the 1-20 range is 10.5). In alternative embodiments, where the generalization is a numerical range, any value in the numerical range is designated as the representative value and is thereafter used in place of any feature value in the numerical range. In some embodiments, where the generalization is for a categorical feature, such as blood type or state of residence, any value in the generalized group of categorical feature values is designated as the representative value and is thereafter used in place of any feature value in the generalized group of categorical feature values.

Figure 7:
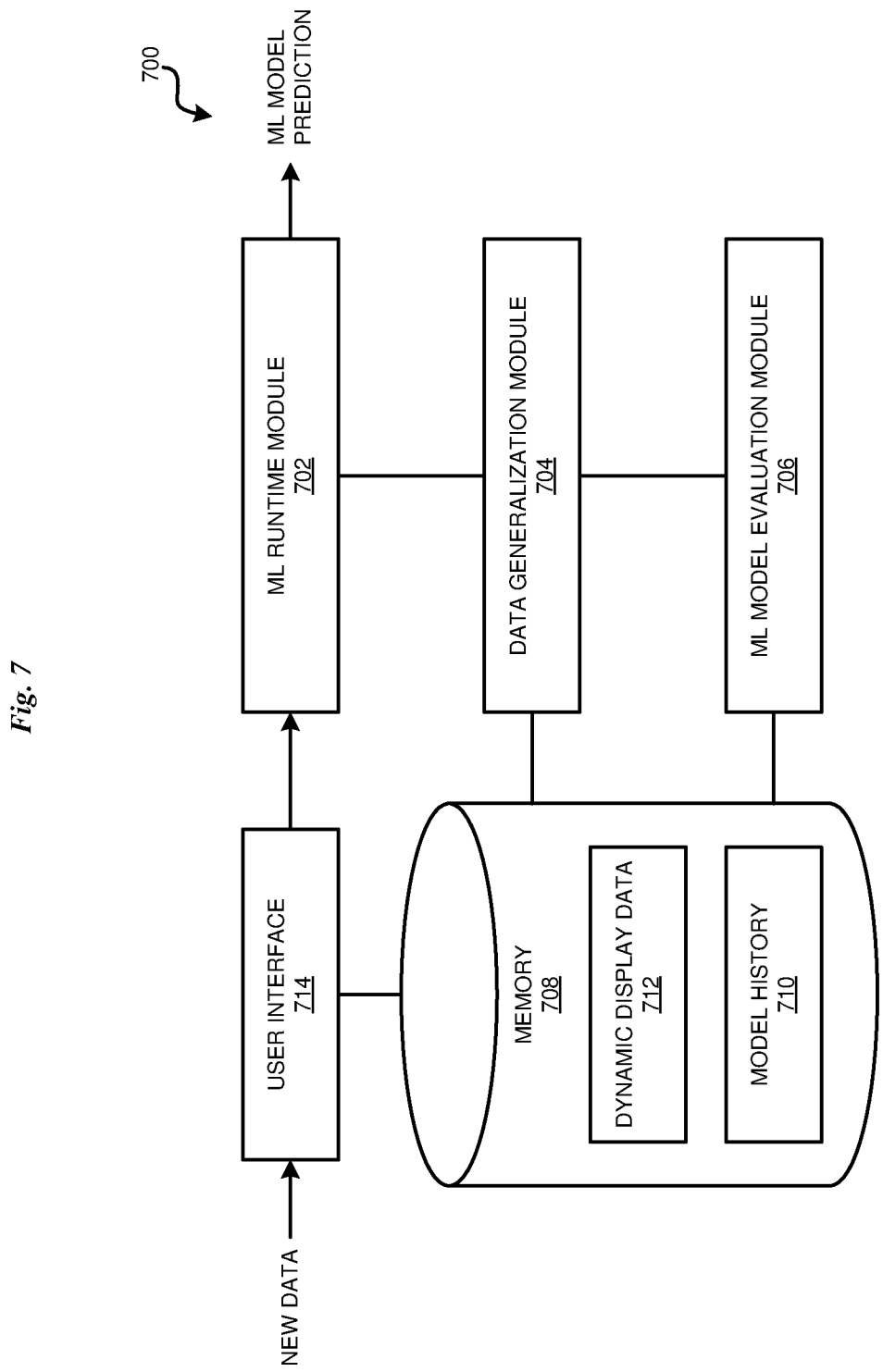
FIG. 7 depicts a block diagram of an example data processing environment in accordance with an illustrative embodiment.

With reference to FIG. 7, this figure depicts a block diagram of an example data processing environment 700 in accordance with an illustrative embodiment. In some embodiments, the data processing environment 700 includes a ML runtime module 702, a data generalization module 704, a ML model evaluation module 706, and a memory 708, which are examples of the ML runtime module 402, data generalization module 404, ML model evaluation module 406, and memory 408, respectively, of FIG. 4. Thus, the descriptions of the ML runtime module 402, data generalization module 404, ML model evaluation module 406, and memory 408 in connection with FIG. 4 apply equally to the ML runtime module 702, data generalization module 704, ML model evaluation module 706, and memory 708, respectively, except where described below.

In the illustrated embodiment, the data generalization module 704 determines a generalized version of feature data that is input to an ML model and still enables the model to make predictions above a threshold level of accuracy. In some embodiments, the ML model evaluation module ML model evaluation module 706 then determines an accuracy of the ML model using the generalized alternative feature. The ML model evaluation module 706 then provides an accuracy value to the data generalization module 704 representative of the determined accuracy of the ML model using the generalized alternative feature. In some embodiments, the ML model evaluation module 706 also stores the accuracy value with the model history 710 in the memory 708.

The data generalization module 704 compares the accuracy of the predictive model to a threshold performance value. In some embodiments, the threshold performance value is a baseline accuracy value of the predictive model using the original (pre-generalization) features. In some such embodiments, the threshold performance value and/or one or more prior accuracy values are stored as model history 710 in the memory 708.

In the illustrated embodiment, the data processing environment 700 includes a user interface 714. In some exemplary embodiments, the user interface 714 may include a Graphical User Interface (GUI), Voice User Interface (VUI), or the like. The user interface 714 may be utilized to obtain feature values from a user. In some such embodiments, the user interface 714 is a dynamic user interface that can be updated based on input provided thereto.

In the illustrated embodiment, if the data generalization module 704 determines that the accuracy of the predictive model using the alternative generalized feature values is acceptable, the data generalization module 704 generates dynamic display data 712. The dynamic display data 712 provides instructions to update the user interface 714 to replace a user input field configured to request or receive the original feature values with an alternative input field configured to request or receive the alternative generalized feature values. For example, the generalization module 704 may replace an age feature, which includes any integer from 1 to 120 as a feature value, with an alternative feature representative of age ranges, for example [1-20], [21-25], [26-50], [51-120]. In this example, the dynamic display data 712 instructs the user interface 714 to replace a user input field that requests an age with a user input field that requests selection of one of the age ranges. The user interface 714 will then output to the ML runtime module 702 a representative value for the selected range.

In some embodiments, where the generalization is a numerical range, the representative value is a median value of the numerical range (e.g., the first representative value for the 1-20 range is 10.5). In alternative embodiments, where the generalization is a numerical range, any value in the numerical range is designated as the representative value and is thereafter used in place of any feature value in the numerical range. In some embodiments, where the generalization is for a categorical feature, such as blood type or state of residence, any value in the generalized group of categorical feature values is designated as the representative value and is thereafter used in place of any feature value in the generalized group of categorical feature values.

Figure 8:
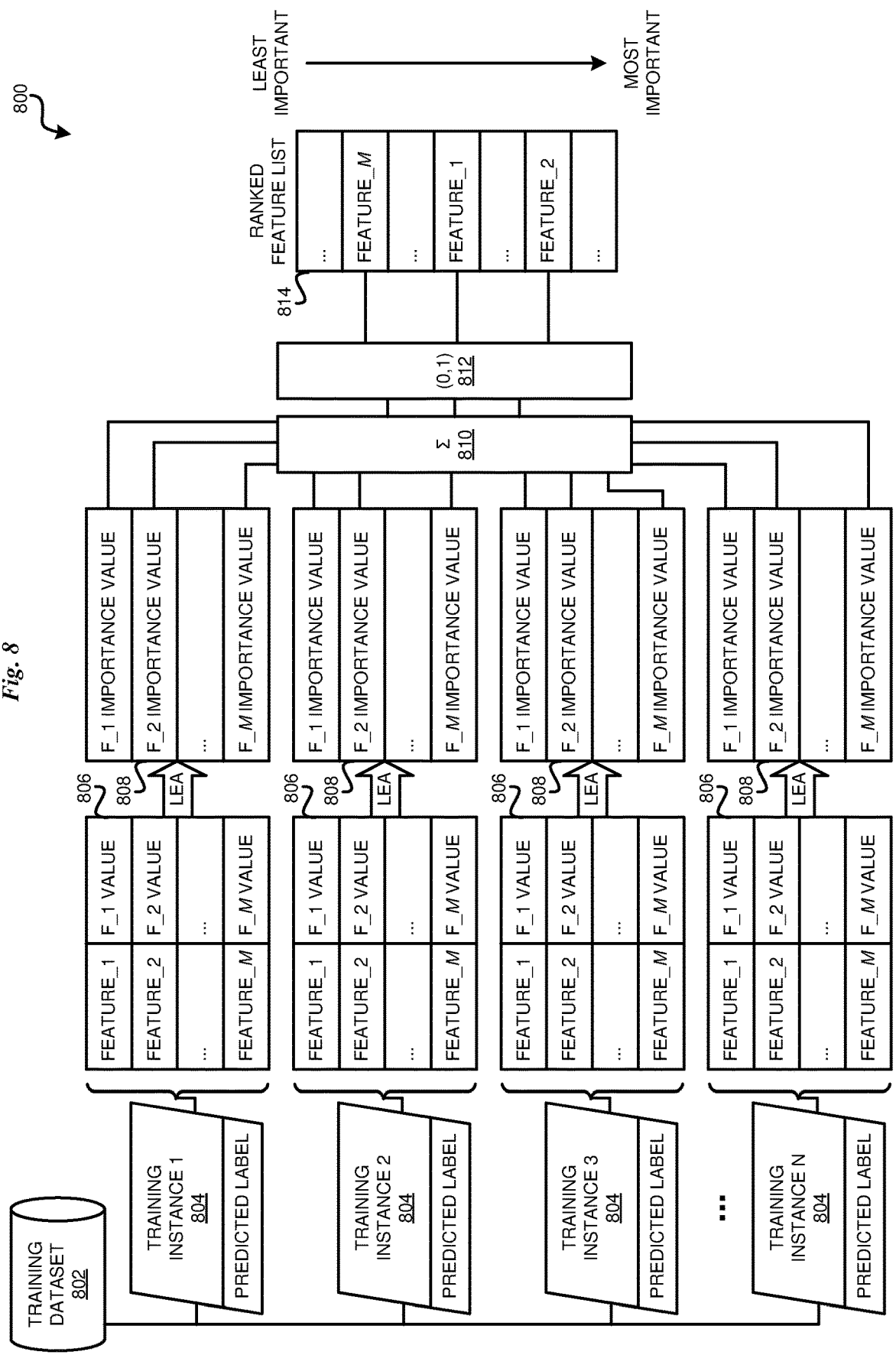
FIG. 8 depicts a block diagram of a data flow of a data generalization module in accordance with an illustrative embodiment.

With reference to FIG. 8, this figure depicts a block diagram of a data flow 800 of a data generalization module in accordance with an illustrative embodiment. In a particular embodiment, the data flow 800 is included in the data generalization module 200.

In the illustrated embodiment, a training/testing dataset 802 includes several training instances 804 that each include predicted labels that a supervised training process can use to test the output of a model being trained. Each of the training instances 804 includes feature values 806 for a specified set of features. A data generalization process according to disclosed embodiments performs a global explainability analysis on each of the features. The global explainability analysis results in feature importance values 808 for each of the feature values 806 of each of the training instances 804. In order to determine an overall importance of each feature, a sum 810 of all of the feature importance values 808 for each feature is calculated and then normalized 812. In other words, a first normalized sum is calculated of all of the F_1 importance values for the first feature FEATURE_1 of training instances 1-N, and a second normalized sum is calculated of all of the F_2 importance values for the second feature FEATURE_2 of training instances 1-N, and so on through the F_M importance values for the Mth feature FEATURE_M of training instances 1-N(where M and N are implementation-specific integer values). The features are then arranged in a ranked feature list 812 according to importance using the normalized sum feature importance values.

Figure 9:
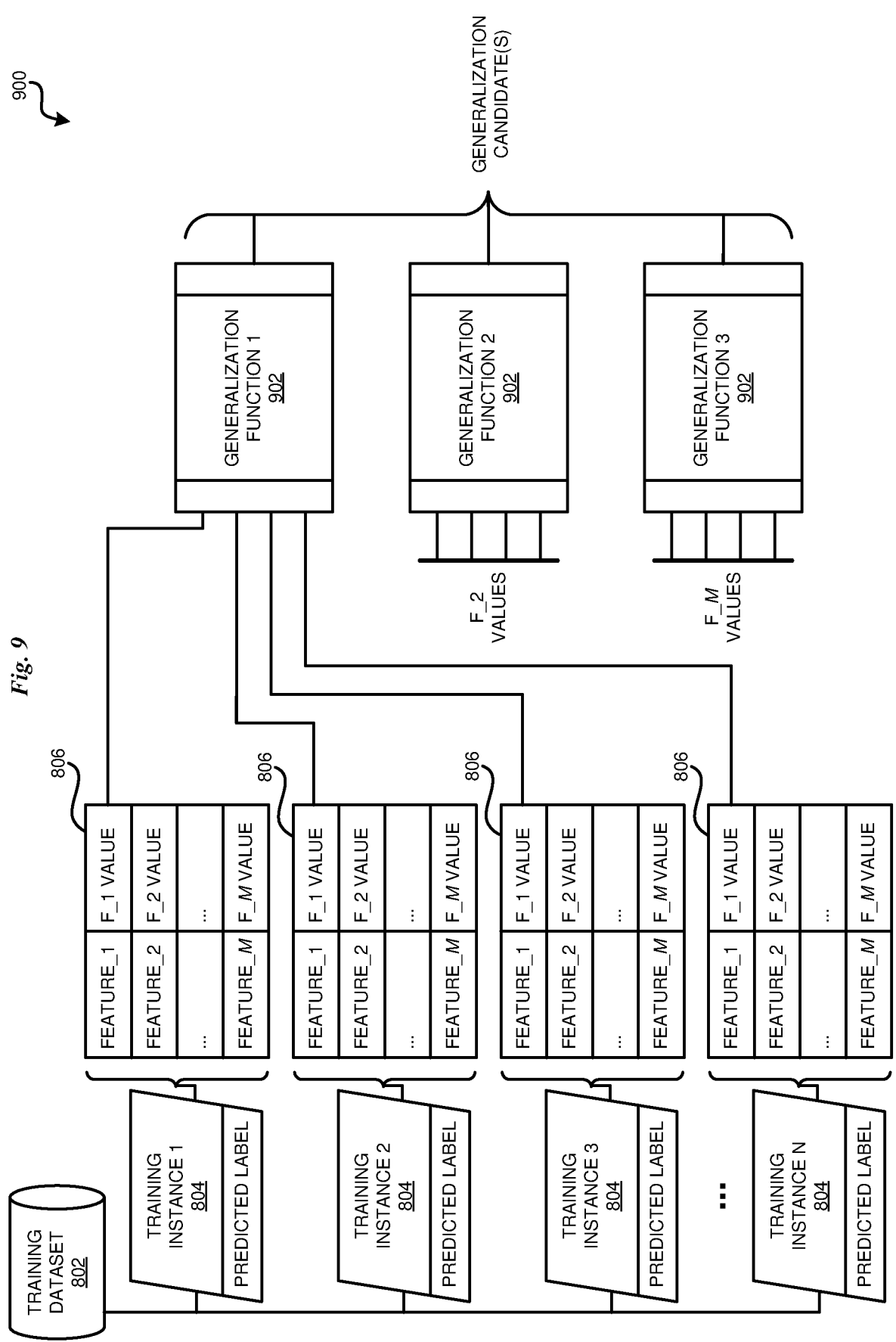
FIG. 9 depicts a block diagram of a data flow of a data generalization module in accordance with an illustrative embodiment.

With reference to FIG. 9, this figure depicts a block diagram of a data flow 900 of a data generalization module in accordance with an illustrative embodiment. In a particular embodiment, the data flow 900 is includes the training dataset 802 having the training instances 804 with feature values 806 of FIG. 8.

In some embodiments, once the features have been ranked as shown in FIG. 8, the generalization process attempts to identify one or more sets of candidate feature values of one or more selected feature. In some such embodiments, a separate generalization function (e.g., k-means, decision tree, agglomerative clustering) is trained and applied to each selected feature. In the example shown in FIG. 9, the selected features are features 1, 2, and M. Thus, a first generalization function 902 is applied to the set of first feature values from each of the training instances 1-N, a second generalization function 902 is applied to the set of second feature values from each of the training instances 1-N, and a third generalization function 902 is applied to the set of Mth feature values from each of the training instances 1-N. Each generalization function 902 outputs a respective set of candidate feature values. In some embodiments, the generalization process applies one set of generalizing candidate feature values at a time and evaluates the predictive model before adding another set of generalizing candidate models. In some embodiments, the generalization process generates multiple generalizing candidate feature values for respective features, and then applies and evaluates two or more of the generalizing candidate feature values at a time.

Figure 10:
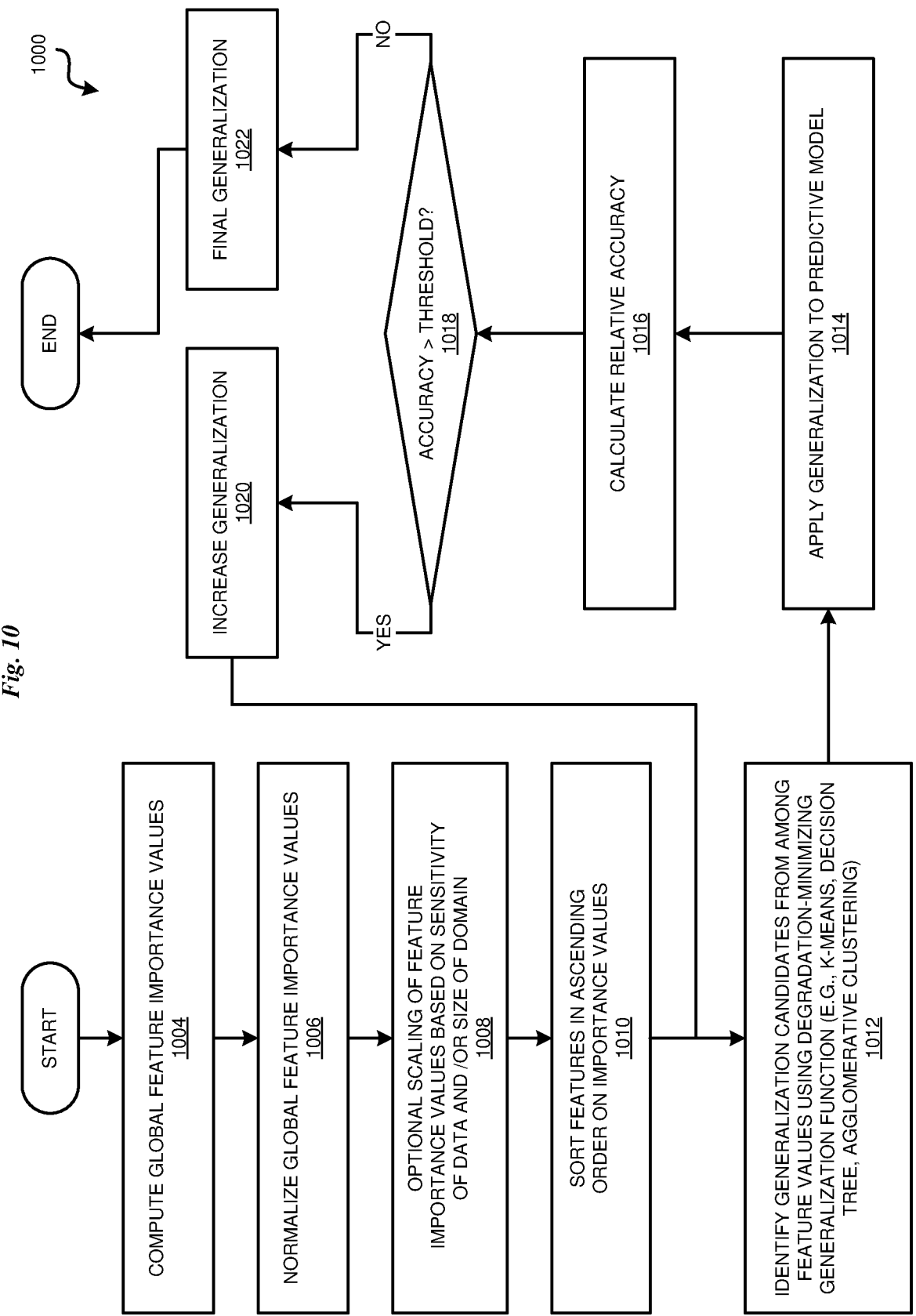
FIG. 10 depicts a flowchart of an example process for generating an optimal replacement schedule in accordance with an illustrative embodiment.

With reference to FIG. 10, this figure depicts a flowchart of an example process 1000 for generating an optimal data generalization in accordance with an illustrative embodiment. In a particular embodiment, the data generalization module 200 carries out the process 1000.

In an embodiment, at block 1004, the process computes global feature importance values. In some embodiments, the process applies a Global Explainability Analysis to a predictive model and dataset in order to determine the relative importance of each feature in the dataset, where the relative importance of a feature is indicative of a degree to which the predictive model was influenced by that feature compared to other features. In some embodiments, the global explainability analysis includes a SHapley Additive exPlanations (SHAP) analysis that results in Shapley values for each of the features in each of the input datasets (e.g., training instances). Each Shapley value represents the contribution of a given feature towards the prediction of the model for a given input dataset. The explanation presents how strongly, and which way, a given feature affects the prediction of the predictive model. In alternative embodiments, other explainability techniques may be used, for example Locally Interpretable Model Agnostic Explanations (LIME). In some embodiments, the process sums each feature's importance values across all of the training instances.

Next, at block 1006, the process normalizes each sum of feature importance values, resulting in global explainability or global feature importance values for each of the features. In some embodiments, the feature importance values are Shapely additive explanation (SHAP) scores.

Next, at block 1008, in some embodiments, additional scaling can be implemented to adjust the global feature importance values prior to sorting. For example, in some embodiments, the feature importance values are weighted for features involving sensitive data, meaning data that one would reasonably prefer to retain as private or confidential information is scaled to make it a higher priority for generalization in order to generalize such sensitive data. As another example, in some embodiments, feature importance values are scaled according to the feature's range, meaning features with a larger domain will be prioritized to be generalized ahead of features with smaller domains. For example, a categorical feature with four categories will be scaled by ¼ while categorical feature with ten categories will be scaled by ¹⁄₁₀. This scaling works equivalently for continuous features. The assumption is that the feature with a higher initial domain can achieve better generalization.

Next, at block 1010, the process sorts the features in ascending order according to the global feature importance values. Next, at bock 1012, the process identifies a set of candidate feature values of one or more selected features. In some such embodiments, the process identifies the candidate feature values using a generalization function (e.g., k-means, decision tree, agglomerative clustering), meaning the generalization function minimizes the reduction in accuracy of the predictive model.

Next, at block 1014, the process replaces each of the one or more selected features with an alternative feature that is a generalization of the selected feature. Then, at block 1016, validation process checks the generalized alternative feature to determine what effect, if any, the generalization has on the accuracy of the predictive model. In some such embodiments, the process evaluates the ML model's ability to generalize and accurately make predictions about the updated generalized data of the training dataset and outputs an accuracy value. The process compares an accuracy of the predictive model to a threshold performance value.

In some embodiments, the process 1000 is an iterative process that gradually increases the generalization of feature values while checking the accuracy of the predictive model such that feature values are increasingly generalized until the accuracy of the model fails to satisfy the threshold performance value. In some embodiments, the increasing of the generalization includes increasing the level of generalization of a particular feature and/or generalizing levels of generalization of multiple features. Thus, at block 1018, the process determines whether the predictive model still has a threshold level of accuracy with the generalized feature. If so, the process increases the generalization of feature values and returns to block 1012. Thus, the process 1000 includes an iterative process that gradually increases the generalization of feature values while checking the accuracy of the predictive model such that the feature values are increasingly generalized until the accuracy of the model fails to satisfy the threshold performance value, at which point the process continues to block 1022, where the generalization values up to last generalization features that resulted in an acceptable accuracy value are implemented and the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    analyzing a predictive model and input data for the predictive model using an explainability algorithm, the analyzing resulting in at least a feature importance value of a feature and an associated priority ranking, wherein the associated priority ranking is adjusted responsive to an assigned weight based at least in part on a sensitivity value of the feature;
    analyzing feature values of the feature using a generalization function, wherein the analyzing of the feature values results in generation of a set of candidate feature values;
    determining, based on the set of candidate feature values and on the associated priority ranking, an alternative feature, wherein the alternative feature is a generalization of the feature, wherein the alternative feature is a generalized feature having a generalized domain, wherein each feature value in the generalized domain corresponds to one or more feature values in a domain of the feature, wherein a number of feature values in the domain is greater than a number of feature values in the generalized domain, whereby the generalized feature is a generalization of the feature;
    comparing an accuracy of the predictive model to a threshold performance value, wherein the accuracy is based on outputs of the predictive model using the alternative feature; and
    mapping, responsive to the accuracy being above the threshold performance value, feature values in the input data that are in the set of candidate feature values to a generalized representative value in the generalized domain.

2. The computer-implemented method of claim 1, wherein the analyzing of the predictive model and input data comprises determining a respective additive explanation score for each feature of each training instance.

3. The computer-implemented method of claim 2, wherein the feature importance value of the feature is based at least in part on an instance of the input data,
    wherein the method further comprises:
    aggregating the feature importance value with feature importance values of the feature for other instances of the input data.

4. The computer-implemented method of claim 3, further comprising:
    generating a ranked list of a set of features of the input data, the set of features comprising said feature, wherein the ranked list of the set of features ranks the features in order of importance based on respective normalized sums of feature importance values.

5. The computer-implemented method of claim 4, wherein the feature is identified as being among the least important features according to the ranked list of the features.

6. The computer-implemented method of claim 5, wherein the analyzing of the feature values of the feature comprises training the generalization function using feature values of the feature.

7. The computer-implemented method of claim 1, further comprising:
    adjusting, through an iterative process and by at least one feature value, a number of feature values included in the set of candidate feature values;
    comparing an accuracy of the predictive model when applied to an adjusted set of candidate feature values to the threshold performance value; and
    updating, based on the comparing, the mapping to the generalized representative value to incorporate the adjusted set of candidate feature values.

8. The computer-implemented method of claim 1, wherein the generalization function is selected from the group consisting of an agglomerative hierarchical clustering algorithm, a decision tree algorithm, and a k-means clustering algorithm.

9. The computer-implemented method of claim 1, wherein the mapping of the feature values comprises mapping a range of feature values to a generalized representative value for the feature, wherein the method further comprises:
applying the predictive model on the generalized representative value.

10. The computer-implemented method of claim 9, further comprising performing an iterative process while the accuracy of the predictive model remains above the threshold performance value, wherein the iterative process comprises:
including at least one additional feature value in the range of feature values resulting in an expanded range of feature values;
mapping the expanded range of feature values to the generalized representative value; and
applying the predictive model on the generalized representative value for the expanded range of feature values.

11. The computer-implemented method of claim 10, wherein the iterative process further comprises:
updating the generalized representative value to a median value of the expanded range of feature values.

12. The computer-implemented method of claim 1, wherein the feature is a categorical feature, and wherein the set of candidate feature values comprises a plurality of categorical feature values.

13. The computer-implemented method of claim 12, further comprising:
selecting one of the plurality of categorical feature values as the generalized representative value in the generalized domain.

14. The computer-implemented method of claim 1, further comprising:
retraining the predictive model using generalized input data, wherein the generalized input data includes the generalized feature value.

15. A computer program product comprising one or more computer readable storage media, and program instructions collectively stored on the one or more computer readable storage media, the program instructions executable by a processor to cause the processor to perform operations comprising:
analyzing a predictive model and input data for the predictive model using an explainability algorithm, the analyzing resulting in at least a feature importance value of a feature and an associated priority ranking, wherein the associated priority ranking is adjusted responsive to an assigned weight based at least in part on a sensitivity value of the feature;
analyzing feature values of the feature using a generalization function, wherein the analyzing of the feature values results in generation of a set of candidate feature values;
determining, based on the set of candidate feature values and on the associated priority ranking, an alternative feature, wherein the alternative feature is a generalization of the feature, wherein the alternative feature is a generalized feature having a generalized domain, wherein each feature value in the generalized domain corresponds to one or more feature values in a domain of the feature, wherein a number of feature values in the domain is greater than a number of feature values in the generalized domain, whereby the generalized feature is a generalization of the feature;
comparing an accuracy of the predictive model to a threshold performance value, wherein the accuracy is based on outputs of the predictive model using the alternative feature; and
mapping, responsive to the accuracy being above the threshold performance value, feature values in the input data that are in the set of candidate feature values to a generalized representative value in the generalized domain.

16. The computer program product of claim 15, wherein the stored program instructions are stored in a computer readable storage device in a data processing system, and wherein the stored program instructions are transferred over a network from a remote data processing system.

17. The computer program product of claim 15, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

18. The computer program product of claim 15, wherein the analyzing of the predictive model and input data comprises determining a respective additive explanation score for each feature of each training instance.

19. The computer program product of claim 15, wherein the generalization function is selected from the group consisting of an agglomerative hierarchical clustering algorithm, a decision tree algorithm, and a k-means clustering algorithm.

20. A computer system comprising a processor and one or more computer readable storage media, and program instructions collectively stored on the one or more computer readable storage media, the program instructions executable by the processor to cause the processor to perform operations comprising:
analyzing a predictive model and input data for the predictive model using an explainability algorithm, the analyzing resulting in at least a feature importance value of a feature and an associated priority ranking, wherein the associated priority ranking is adjusted responsive to an assigned weight based at least in part on a sensitivity value of the feature;
analyzing feature values of the feature using a generalization function, wherein the analyzing of the feature values results in generation of a set of candidate feature values;
determining, based on the set of candidate feature values and on the associated priority ranking, an alternative feature, wherein the alternative feature is a generalization of the feature, wherein the alternative feature is a generalized feature having a generalized domain, wherein each feature value in the generalized domain corresponds to one or more feature values in a domain of the feature, wherein a number of feature values in the domain is greater than a number of feature values in the generalized domain, whereby the generalized feature is a generalization of the feature;

comparing an accuracy of the predictive model to a threshold performance value, wherein the accuracy is based on outputs of the predictive model using the alternative feature; and mapping, responsive to the accuracy being above the threshold performance value, feature values in the input data that are in the set of candidate feature values to a generalized representative value in the generalized domain.

\* \* \* \* \*